Sept. 4, 1923.
B. W. ELLIOTT
AUTOMOBILE SIGNAL LIGHT
Filed March 13, 1922
1,466,874
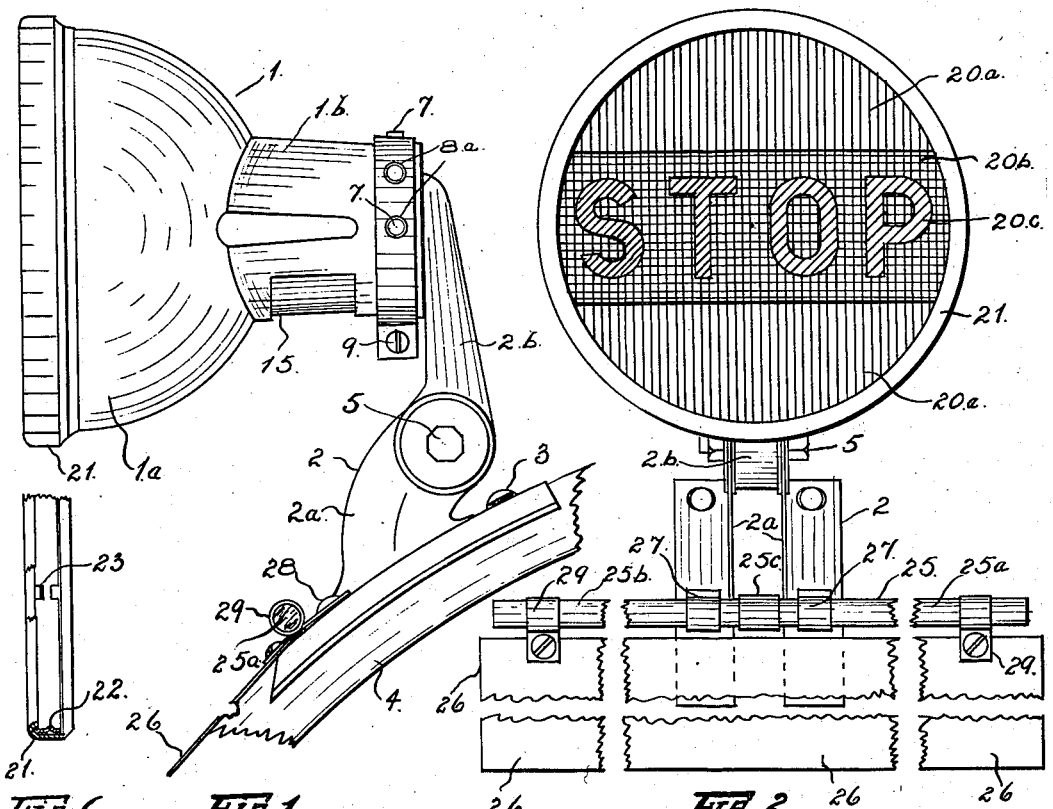
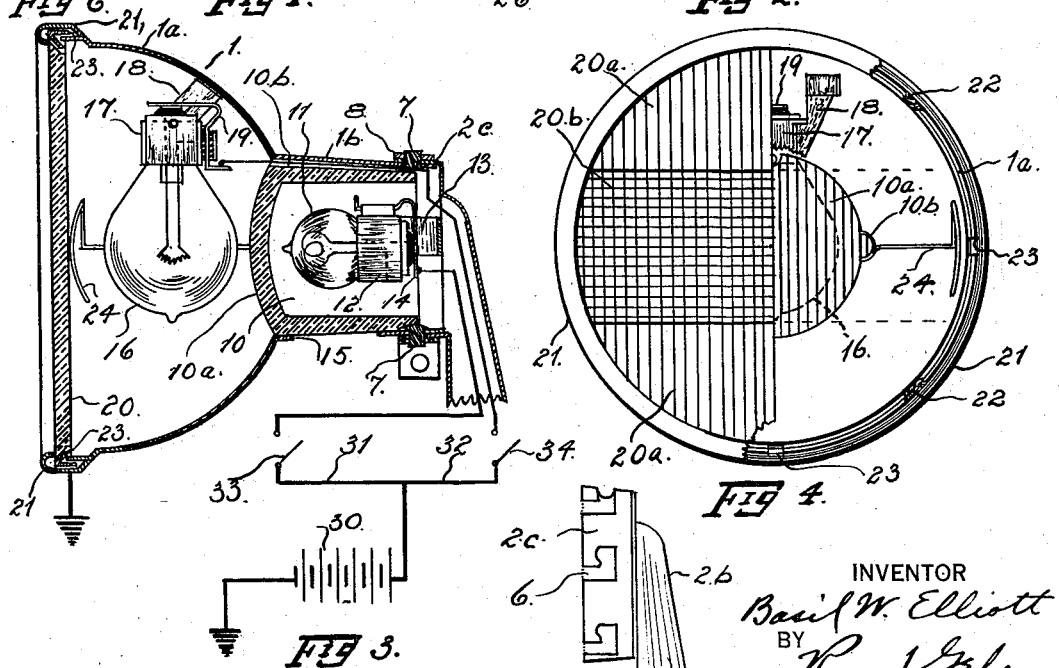
INVENTOR
Basil W. Elliott
BY
Ray J. Gehr
ATTORNEY Patented Sept. 4, 1923.

1,466,874

UNITED STATES PATENT OFFICE.

BASIL W. ELLIOTT, OF CLEVELAND, OHIO, ASSIGNOR TO THE TRAFOLITE MANUFACTURING COMPANY, OF CLEVELAND, OHIO, A CORPORATION OF OHIO.

AUTOMOBILE SIGNAL LIGHT.

Application filed March 13, 1922. Serial No. 543,523.

*To all whom it may concern:*

Be it known that I, BASIL W. ELLIOTT, a citizen of the United States, residing at Cleveland, in the county of Cuyahoga and State of Ohio, have invented certain new and useful Improvements in and Relating to Automobile Signal Lights, of which the following is a specification, reference being had therein to the accompanying drawings.

The invention relates to automobile traffic signals of the type in which a tail light and a stop signal are combined.

One of the objects of the invention is to provide a combined stop signal and tail light that is very compact, simple in construction and neat in appearance.

Another object of the invention is the provision of a combined tail light and stop signal of substantially the same size and appearance as an ordinary stop signal.

A further object of the invention is the provision of a new and improved method of displaying stop and tail light signals through a single lens.

Another object of the invention is the provision of an improved combined mounting for a signal light and a license number plate.

Other objects, more or less incidental or ancillary to the foregoing, will appear in the following description which sets forth in connection with the accompanying drawing a preferred form of construction embodying my improvements.

In the drawing, Fig. 1 is a side elevation of my improved signal and associated license plates, shown attached to the mud guard of an automobile, a part of the license plate being broken away.

Fig. 2 is the rear elevation of the parts shown in Fig. 1.

Fig. 3 is a vertical central section through the main parts of the signal together with a diagram of the electrical connections.

Fig. 4 is a rear elevation of the main part of the signal with the right half of the lens cut away to expose the interior parts.

Fig. 5 is a side elevation of the upper part of the bracket arm on which the lamp casing of the signal is mounted.

Fig. 6 is a sectional view of the inner side of a portion of the bezel of the lamp.

Referring in detail to the construction illustrated, 1 designates a sheet metal lamp casing comprising a main section or part $1^a$ which is preferably semi-spherical in form and a relatively contracted tubular section $1^b$ extending from the main section. The tubular section is preferably tapered somewhat is shown. A supporting bracket designated in its entirety by 2 comprises base sections $2^a$, $2^a$ secured by rivets or bolts 3 to the mud guard 4, or other part, of the automobile structure. The bracket also comprises a hollow arm $2^b$ adjustably clamped by a bolt 5 between the upstanding parts of the base sections $2^a$. At its upper end the arm $2^b$ is expanded and formed with an annular flange or wall $2^c$ adapted to receive and fit around the end of the tubular sections $1^b$ of the lamp casing. The wall $2^c$ is formed with a series of bayonet slots 6 and the casing section $1^b$ carries a plurality of bayonet lugs 7 adapted to engage said slots. With the series of bayonet slots as shown, the casing 1 can be applied to the arm $2^b$ in any one of several different angular positions. The casing when applied to the bracket arm $2^b$ is firmly secured against displacement by a clamping band 8 which has a clamping bolt 9 extending through its ends as shown in Fig. 1. The clamping band 8 is formed with a series of apertures $8^a$ corresponding in number and arrangement to the series of bayonet slots $b$ and adapted to fit over the bayonet lugs 7. Thus when the clamping band is applied and tightened up it serves by its firm frictional engagement with the wall $2^c$ to secure the lugs 7 against movement in the bayonet slots. At the same time by simply loosening the clamping bolt 9 the band 8 can be removed and the lamp casing detached from the bracket.

Within the tubular section $1^b$ of the casing is tightly fitted a glass cup 10 having its end wall $10^a$ disposed to form a partition between the main section $1^a$ and the tubular section $1^b$ of the casing. The cup is preferably provided on its sides with ribs $10^b$ which engage recesses in the wall of the casing section $1^b$ and secure the cup against turning. Within the glass cup is arranged an electric light 11 which is mounted in a socket 12 carried by a bracket 13 secured to the bracket arm $2^b$. One terminal of the lamp is electrically connected to a contact arm 14 mounted on the socket 12 but insulated therefrom, while the other terminal of the lamp bulb is electrically connected to the socket 12 and thus to ground.

The end wall 10ª of the glass cup is colored red and is thus adapted to transmit red rays only from the light 11. The side wall of the cup 10 is uncolored and the section 1ᵇ of the lamp casing is cut away on its under side to form a window 15 through which light is projected from the light 11 to illuminate the license number plate, as will presently be explained.

In the main section 1ª of the lamp casing is arranged an electric lamp 16 which is mounted in a socket 17 carried by bracket 18 secured to the inner wall of the casing. One terminal of the lamp 17 is electrically connected to a contact arm 19 mounted on but insulated from the socket 17, while its other terminal is electrically connected to the socket 17 and thus to ground.

The open side of the main section 1ª of the metal casing is closed by a lens 20 of peculiar construction. This lens, as shown in Fig. 2, has top and bottom segments 20ª, 20ª which are translucent and colored to transmit red rays only. Across the middle part of the lens is a horizontally disposed dark, opaque section 20ᵇ which is formed with translucent parts constituting a signal symbol 20ᶜ. In the construction shown this symbol is the word "Stop," the letters being formed by translucent glass of a color incapable of transmitting red rays. I prefer that said signal letters be colored green.

In the construction of the lens 20 the segments 20ª can be divided from the opaque panel 20ᵇ by ribs and the letters forming the symbol "Stop," are preferably raised. The panel 2ᵇ can be rendered opaque by applying a suitable enamel and baking it on. The red color can then be "flashed" on the segments 2ª and the green color is preferably made by burning in a suitable translucent enamel such as Homel 600 A, translucent, on the symbol "Stop." Also, the inner side of the lens can be formed with a relatively fine prismatic surface in accordance with the usual practice.

The lens 20 can be secured in the casing in any desired manner but I prefer to secure it by means of a bezel 21 which is secured to the casing section 1ª by means of a plurality of bayonet joints 22 corresponding in number and relative arrangement to the bayonet slots 6 of the bracket arm 2ᵇ. Lugs 23 engage notches in the lens 20 and serve to secure it to the bezel 21 and to prevent it from turning in relation to said bezel. A pair of spring arms 24 are secured to the casing structure and by pressing against the lens 20 serve to normally prevent disengagement of the bayonet connections.

On the base members 2ª of the bracket is mounted a transverse rod 25 adapted to support a license number plate 26. The rod 25 is preferably made in two sections 25ª, 25ᵇ which are detachably secured together by means of a screw threaded sleeve 25ᶜ. The rod is preferably secured to the bracket sections by means of clamping sleeves 27 secured by screw bolts 28. The screw secured clamping sleeves 29 serve to attach the license plate 26 to the rod 25. The rod 25 can have its central part engaged by clamps 29 on either end, and thus the license plate can be disposed centrally with respect to the signal or so as to project almost entirely to the right thereof or almost entirely to the left thereof. If the rod 25 is clamped centrally as shown, the two sections 25ª, 25ᵇ, in assembling, are passed through clamps 27 and then screwed into coupling sleeve 25ᶜ. The rod 25 is divided into sections to facilitate packing for shipment.

When the license plate is arranged centrally with respect to the lamp casing the latter is applied to the bracket arm 2ᵇ with its window 15 directed directly downward so that the number plate is properly illuminated by light projected downward from the light 11. If the license plate is mounted to project to the right or to the left of the signal lamp then the lamp casing is turned in one direction or the other, from its central position shown in Fig. 1, in applying it to the bracket arm 2ᵇ so that the window 15 will be directed in a direction to light the number plate. The series of bayonet slots 6 provide for this adjustable mounting of the lamp casing 1. However when the lamp casing 1 is thus adjusted it will be understood that the lens 20 must be correspondingly adjusted on the casing in the opposite direction in order to maintain the stop symbol in a horizontal, reading position. This is permitted by the provision of the series of connections 22 corresponding to the series of bayonet slots 6 on the bracket arm 2ᵇ.

In Fig. 3, the electrical connections for the signal are shown diagrammatically. 30 is a storage battery such as is usually carried on automobiles to supply current for the starting motor and lights. One terminal of the battery is grounded as indicated while the other terminal is connected with the leads 31 and 32. The lead 31 is connected to the contact arm 14 which in turn is connected to one terminal of the electric lamp 11, while the lead 32 is connected to the contact arm 19 which supplies current to the lamp 16. The lead 31 is provided with a control switch 33 which may be of any suitable hand-operated form. Lead 32 is provided with a switch 34 which is preferably operated by the brake pedal of the machine. The two leads 31 and 32 are led upward through the hollow bracket arm 2ᵇ which serves to effectively protect them, as well as giving the signal a neat appearance. The lead 32 passes from the hollow bracket arm 2$^b$ through a groove 10$^b$ in the glass cup 10. The grounding of the metal casing of the signal is of course effected by its connection with the metal framework of the automobile.

From the foregoing description the use and operation of the signal will readily be understood. After dark, the switch 33 is closed to energize the lamp 11, the light of which is projected through the red end 10$^a$ of the last cup so that only red rays fall upon the lens 20. These red rays are transmitted by the segments 20$^a$ but are not transmitted by the green "stop" symbol and of course are not transmitted by the opaque panel 20$^b$. The illuminated red panels 20$^a$ thus serve as a tail light. In addition light from the lamp 11 is projected downward through the window 15 to illuminate the license number plate 26.

In the operation of the car, assuming that switch 34 is connected for operation by the brake pedal, each time the brake is applied to stop or slow the movement of the car, said switch is closed and the lamp 16 energized. The light from lamp 16 is projected through the "stop" symbol so that said symbol flashes into view and serves to warn those following the machine that it is stopping or reducing its speed. At the same time the increased illumination from the lamp 16 materially strengthens the red light transmitted by the red segments 20$^a$ and this serves additionally to attract the attention of those behind the machine. In daylight the switch 33 is kept open but, as at night, the switch 34 will be closed by the application of the brake, thereby operating the stop signal, which is readily seen in daylight.

With my improved construction the single lens serves the purpose of both a tail light and a stop signal and this is accomplished without increasing the size of the lens and the casing over that required for the stop signal alone.

Furthermore, this result is secured by the use of a lens in which the stop signal and the tail light panels are symmetrically arranged and without the use of opaque partitions within the casing.

By reason of the improved mounting of the license number plate and the means for directing the light thereon in its various positions of adjustment relative to the signal, the device is adapted for mounting in various positions on the automobile as may be most convenient or desirable in each particular case.

While I have shown and described separate electric lamp bulbs as the respective separate sources of the lights of different colors and have shown and described the particular details of construction which I prefer, it is to be understood that the sources of light need not be in separate bulbs and that the various features of the signal can be embodied in a great variety of ways without departing from the invention as defined in the appended claims.

What I claim is:

1. In a combined stop and tail light signal, the combination of a casing and plurality of sources of light of different colors in said casing, a lens closing one side of said casing, said lens having a translucent tail light section adapted to transmit the light from one of said colored light sources and an opaque section bearing a translucent signal symbol adapted to transmit the light from another of said light sources but not light of the color transmitted by the tail light section, and means for energizing said sources of light independently of each other.

2. In a combined stop and tail light signal, the combination of a casing, a lens in one side of said casing said lens having a translucent red tail light section and an opaque section having a translucent green signal symbol, a source of red light in the casing, and a source of light transmissible through said green symbol, and means for energizing the two sources of light independently of each other.

3. In a combined stop and tail light signal, the combination of a casing, a lens in one side of said casing said lens having a translucent red tail light section and an opaque section having a translucent green signal symbol, a source of red light in the casing, a source of light in the casing transmissible through both the green symbol and the red tail light section, and means for energizing said two sources of light independently of each other.

4. In a combined stop and tail light signal, the combination of a sheet metal casing having a main section and a contracted tubular section extending from the main section, a lens closing one side of the main section, said lens having a translucent red section and an opaque section with a translucent signal symbol of a color incapable of transmitting red light, a glass cup mounted in the tubular section of the casing, said cup having its end wall colored to transmit a translucent red light only and disposed to form a partition between the tubular and main parts of the casing, an electric light bulb disposed in the cup, a second electric light bulb disposed in the main part of the casing between said partition and the lens, and means for energizing the two lights independently of each other.

5. In an automobile traffic light, the combination of a casing comprising a tubular metal section and a cup shaped glass section within the metal section, the end of the cup shaped glass section being colored to transmit red light only while the side of said section is adapted to transmit white light and the tubular metal section having an opening exposing the side wall of the glass section on one side, and a source of white light inside the glass section, the light from said source transmitted through the end of the glass cup being adapted to serve as a tail light and that transmitted through the side wall being adapted to illuminate a license number plate or the like.

6. In an automobile traffic signal, the combination of a bracket adapted to be attached to the automobile structure, a transverse rod mounted on the bracket for transverse adjustment, said rod being adapted to support a license number plate, a lamp casing having a window to permit light to pass to the license plate, and means for detachably securing the casing to the bracket in any one of several angular positions to project light through the window upon the license plate when it is in correspondingly different positions of adjustment relative to the bracket.

7. In an automobile traffic signal, the combination of a bracket adapted to be attached to the automobile structure, a transverse rod mounted on the bracket for transverse adjustment, said rod being adapted to support a license number plate, a lamp casing having a window to permit light to pass to the license plate, means for detachably securing the casing to the bracket in any one of several angular positions to project light through the window upon the license plate when it is in correspondingly different positions to adjustment relative to the bracket, a lens for the lamp casing bearing a traffic symbol, and means for securing the lens in the casing in different angular positions corresponding to the different angular positions of the casing, whereby the lens can be maintained with its traffic symbol in an upright position for reading regardless of the angular adjustment of the casing of the bracket.

8. In an automobile traffic light, the combination of a bracket adapted to be attached to the automobile structure, said bracket having an arm formed with an annular flange or wall, a lamp casing formed with an annular wall, one of said annular walls being of a size to fit within the other, and means for detachably connecting the casing to the arm comprising bayonet slots in one of the annular walls, lugs on the other of said walls to engage said slots and a clamping band around the annular walls and engaging the bayonet lugs to hold them against movement in the bayonet slots.

In testimony whereof I hereunto affix my signature.

BASIL W. ELLIOTT.